(12) United States Patent
Liu et al.

(10) Patent No.: US 9,846,646 B1
(45) Date of Patent: Dec. 19, 2017

(54) METHODS AND DEVICES FOR LAYERED PERFORMANCE MATCHING IN MEMORY SYSTEMS USING C-AMAT RATIOS

(71) Applicant: C-Memory, LLC, Darien, IL (US)

(72) Inventors: Yu-Hang Liu, Beijing (CN); Xian-He Sun, Darien, IL (US)

(73) Assignee: C-Memory, LLC, Darien, IL (US)

( * ) Notice: Subject to any disclaimer, the term of this patent is extended or adjusted under 35 U.S.C. 154(b) by 0 days.

(21) Appl. No.: 15/239,141

(22) Filed: Aug. 17, 2016

(51) Int. Cl.
| G06F 12/00 | (2006.01) |
| G06F 12/0815 | (2016.01) |
| G06F 12/0811 | (2016.01) |
| G06F 11/14 | (2006.01) |
| G06F 12/08 | (2016.01) |

(52) U.S. Cl.
CPC ...... *G06F 12/0815* (2013.01); *G06F 12/0811* (2013.01); *G06F 11/1425* (2013.01); *G06F 12/08* (2013.01); *G06F 2212/283* (2013.01); *G06F 2212/621* (2013.01)

(58) Field of Classification Search
CPC ............. G06F 12/0815; G06F 12/0811; G06F 2212/283; G06F 2212/621; G06F 11/1425; G06F 12/08
USPC ................................... 710/60; 711/167, 154
See application file for complete search history.

(56) References Cited

U.S. PATENT DOCUMENTS

| 7,107,399 | B2 * | 9/2006 | Bilardi | G06F 12/08 |
| | | | | 711/111 |
| 2004/0003147 | A1 * | 1/2004 | Masputra | H04L 29/06 |
| | | | | 710/52 |
| 2007/0067382 | A1 * | 3/2007 | Sun | G06F 12/0862 |
| | | | | 709/203 |

(Continued)

OTHER PUBLICATIONS

Xian-He Sun, Dawei Wang, "Concurrent Average Memory Access Time", Computer, vol. 47, No. 5, pp. 74-80, May 2014, doi:10. 1109/MC.2013.227.

(Continued)

*Primary Examiner* — Hong Kim
(74) *Attorney, Agent, or Firm* — McDonnell Boehnen Hulbert & Berghoff LLP (57) ABSTRACT

In one embodiment, the present disclosure describes a method of optimizing memory access in a hierarchical memory system. The method includes determining a request rate from an $i^{th}$ layer of the hierarchical memory system for each of n layers in the hierarchical memory system. The method also includes determining a supply rate from an $(i+1)^{th}$ layer of the hierarchical memory system for each of the n layers in the hierarchical memory system. The supply rate from the $(i+1)^{th}$ layer of the hierarchical memory system corresponds to the request rate from the $i^{th}$ layer of the hierarchical memory system. The method further includes adjusting a set of computer architecture parameters of the hierarchical memory system or a schedule associated with an instruction set to utilize heterogeneous computing resources within the hierarchical memory system to match a performance of each adjacent layer of the hierarchical memory system.

18 Claims, 7 Drawing Sheets

(56) References Cited

U.S. PATENT DOCUMENTS

2008/0273457 A1* 11/2008 Sun .................. G06F 9/4856
370/221
2012/0311270 A1* 12/2012 Sun .................. G06F 12/0862
711/137

OTHER PUBLICATIONS

Dawei Wang, Xian-He Sun, "APC: A Novel Memory Metric and Measurement Methodology for Modern Memory Systems", IEEE Transactions on Computers, vol. 63, No. 7, pp. 1626-1639, Jul. 2014.
Yu-Hang Liu, Xian-He Sun, 2014. "LPM: Concurrency-driven Layered Performance Matching", 2015 44th International Conference on Parallel Processing, pp. 879-888, DOI: 10.1109/ICPP.2015.97.

* cited by examiner

METHODS AND DEVICES FOR LAYERED PERFORMANCE MATCHING IN MEMORY SYSTEMS USING C-AMAT RATIOS

BACKGROUND

Unless otherwise indicated herein, the materials described in this section are not prior art to the claims in this application and are not admitted to be prior art by inclusion in this section.

In computing, the term "memory wall" describes the growing disparity between central processing unit (CPU) speeds and speeds of memory located outside the CPU. A prominent factor contributing to the speed disparity is the relatively slow performance of the memory located outside the CPU. During the last two decades, this disparity has increased, thereby exacerbating computational performance issues relating to the memory wall. Over that time period, processors have advanced from handling instructions in-order to out-of-order and utilize multiple cores. Such processing advances have put more pressure on the memory system. Meanwhile, data intensive applications have become increasingly common in diverse fields such as bioinformatics, computer aided design, and complex social media interactions. As a result, memory stall time (the time a processor is waiting for data from a memory) accounts for a significant portion of total application execution time. As such, data stall time creates a performance bottleneck in many computing systems. At the same time, memory systems have advanced with many concurrency-oriented features such as multiple ports, multiple banks, pipelines, and non-blocking caches, which may present an opportunity for innovation.

Hierarchical memory is a design of modern computers to ease the memory wall problem. An advantage provided by memory hierarchy is data locality, which may be described more specifically as temporal and spatial locality. That is, previously accessed data can be readily used again in future data accesses (temporal locality), and the data near the previously accessed data are likely to be used next (spatial locality).

In addition to memory hierarchy, a modern memory system is supported by various data access concurrency. The overall performance of a memory system is based on a combination of memory hierarchy and concurrency.

SUMMARY

The present disclosure describes embodiments that relate to methods and devices for layered performance matching in hierarchical memory.

The embodiments described herein may be employed to address the memory wall issue in a hierarchical memory system. For example, such embodiments may provide for global optimization of memory access in the hierarchical memory system. Such a global optimization may be achieved by collectively optimizing each of many memory layers (e.g., n layers) by matching a request rate of an upper adjacent layer in the hierarchical memory system to a supply rate of a lower corresponding adjacent layer in the hierarchical memory system. By accurately matching the performance of each adjacent layer of the hierarchical memory system, the performance of the hierarchical memory system can be adjusted to match the performance of the hierarchical memory system's computing capacity (e.g., a central processing unit of the hierarchical memory system). Further, the performance of each adjacent layer of the hierarchical memory system may be matched based on a concurrent average memory access time (C-AMAT) model.

In an aspect, the present disclosure describes a method of optimizing memory access in a hierarchical memory system. The method includes determining a request rate from an $i^{th}$ layer of the hierarchical memory system for each of n layers in the hierarchical memory system. The method also includes determining a supply rate from an $(i+1)^{th}$ layer of the hierarchical memory system for each of the n layers in the hierarchical memory system. The supply rate from the $(i+1)^{th}$ layer of the hierarchical memory system corresponds to the request rate from the $i^{th}$ layer of the hierarchical memory system. The method further includes adjusting a set of computer architecture parameters of the hierarchical memory system or a schedule associated with an instruction set to utilize heterogeneous computing resources within the hierarchical memory system to match a performance of each adjacent layer of the hierarchical memory system.

In an aspect, the present disclosure describes a method of optimizing memory access in a hierarchical memory system. The method includes determining a first layered performance matching ratio between a first layer of the hierarchical memory system and a second layer of the hierarchical memory system. Determining the first layered performance matching ratio includes summing: (1) a ratio of: (a) a first hit time value to (b) a first hit concurrency value with (2) a product of: (i) a first pure miss rate value and (ii) a ratio of: (a) a first pure average miss penalty value to (b) a first pure miss concurrency value. Determining the first layered performance matching ratio also includes multiplying: (1) the determined sum by (2) a ratio of: (a) a value corresponding to a portion of instructions of an executable instruction set that accesses the hierarchical memory system to (b) a value corresponding to a number of cycles per executable instruction when no misses occur. The method additionally includes comparing the determined first layered performance matching ratio to a first threshold layered performance matching ratio. Further, the method includes adjusting, if the determined first layered performance matching ratio exceeds the first threshold layered performance matching ratio, at least one of a set of computer architecture parameters of the hierarchical memory system corresponding to the first layered performance matching ratio.

In an aspect, the present disclosure describes a hierarchical memory system. The hierarchical memory system includes a first layer. The hierarchical memory system also includes a second layer. The hierarchical memory system further includes a first layered performance matching ratio between the first layer and the second layer. Additionally, the hierarchical memory system includes a set of computer architecture parameters corresponding to the first layered performance matching ratio. The first layered performance matching ratio includes a product between: (1) a sum and (2) a ratio of: (a) a value corresponding to a portion of instructions of an executable instruction set that accesses the hierarchical memory system to (b) a value corresponding to a number of cycles per executable instruction when no misses occur. The sum is between: (i) a ratio of: (a) a first hit time value to (b) a first hit concurrency value and (ii) a product of: (1) a first pure miss rate value and (2) a ratio of: (a) a first pure average miss penalty value to (b) a first pure miss concurrency value. The hierarchical memory system is configured to adjust at least one of the set of computer architecture parameters corresponding to the first layered performance matching ratio if the first layered performance matching ratio exceeds a first threshold layered performance matching ratio.

In an aspect, the present disclosure describes a method of accessing memory in a hierarchical memory system that includes a first layer, a second layer, a first layered performance matching ratio between the first layer and the second layer, and a set of computer architecture parameters. The method includes executing an instruction set. The set of computer architecture parameters corresponds to the first layered performance matching ratio. The first layered performance matching ratio is a product between: (1) a sum and (2) a ratio of: (a) a value corresponding to a portion of instructions of the executed instruction set that accesses the hierarchical memory system to (b) a value corresponding to a number of cycles per executed instruction when no misses occur. The sum is between: (i) a ratio of: (a) a first hit time value to (b) a first hit concurrency value and (ii) a product of: (1) a first pure miss rate value and (2) a ratio of: (a) a first pure average miss penalty value to (b) a first pure miss concurrency value. The method also includes adjusting a schedule associated with the instruction set to utilize heterogeneous computing resources within the hierarchical memory system such that the first layered performance matching ratio does not exceed a first threshold layered performance matching ratio.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

The present disclosure includes a method for global optimization of a hierarchical memory system. The global optimization method may include determining a request rate for each level in the hierarchical memory system as well as corresponding supply rates. Further, the method may include adjusting a set of computer architecture parameters of the hierarchical memory system or a schedule associated with an instruction set to utilize heterogeneous computing resources within the hierarchical memory system. These adjustments may be made to match the performance of each adjacent layer within the hierarchical memory system such that the performance of the hierarchical memory system can precisely match the performance of the hierarchical memory system's computation capability.

Another example embodiment includes a method of optimizing memory access in a hierarchical memory system. The method may include determining a layered performance matching ratio (LPMR). The LPMR may be determined based on a first layer and a second layer of the hierarchical memory system. The first layer and the second layer may communicate with one another to provide hierarchical memory access. This may occur, for example, by the first layer transmitting memory access requests to the second layer and the second layer responding to the memory access requests. Further, the LPMR may depend on one or more computer architecture parameters of the hierarchical memory system that could in turn depend on one or more computer architecture components.

The LPMR may be compared to a first threshold layered performance matching ratio (T) to determine if the hierarchical memory system is sufficiently optimized. In some example embodiments, the T may correspond to a sufficient response rate from the second layer given a request rate from the first layer. If the LPMR is higher than the T, the method may then include adjusting at least one of the set of computer architecture parameters. Adjusting such computer architecture parameters may serve to change the LPMR. Upon adjusting the computer architecture parameters, the LPMR may again be determined and the computer architecture parameters may be readjusted (e.g., if the LPMR is once again greater than T). This iterative process may continue until the threshold condition is met.

In some embodiments of the method, an LPMR may be determined between multiple pairs of memory levels in the hierarchical memory system. For example, an LPMR may be determined between a first level cache and a second level cache and another LPMR may be determined between the second level cache and a third level cache. Each of the one or more LPMRs may additionally be individually or collectively optimized by adjusting computer architecture parameters.

Further, the method may include a determination of a delta value. The delta value may indicate a difference between the LPMR and the T. Further, the delta value may be used to determine if an overprovision of hardware has occurred (e.g., if the LPMR is significantly lower than the T, corresponding to a large delta value, hardware may be overprovided). As an example, if the delta value is greater than a threshold delta value, the computer architecture parameters may be further adjusted to reduce the hardware overprovision. Such adjustment may include one or more further determinations of the LPMR and the corresponding delta value to ensure an appropriate provision of hardware. The delta value may be determined and compared to a threshold delta value for multiple LPMRs, in some embodiments.

In addition to or alternative to adjusting computer architecture parameters, the method may include adjusting a schedule of instructions, executed by a processor. Adjusting the schedule may allow the instructions to align with the hardware of the hierarchical memory system.

II. Example Systems

Figure 1:
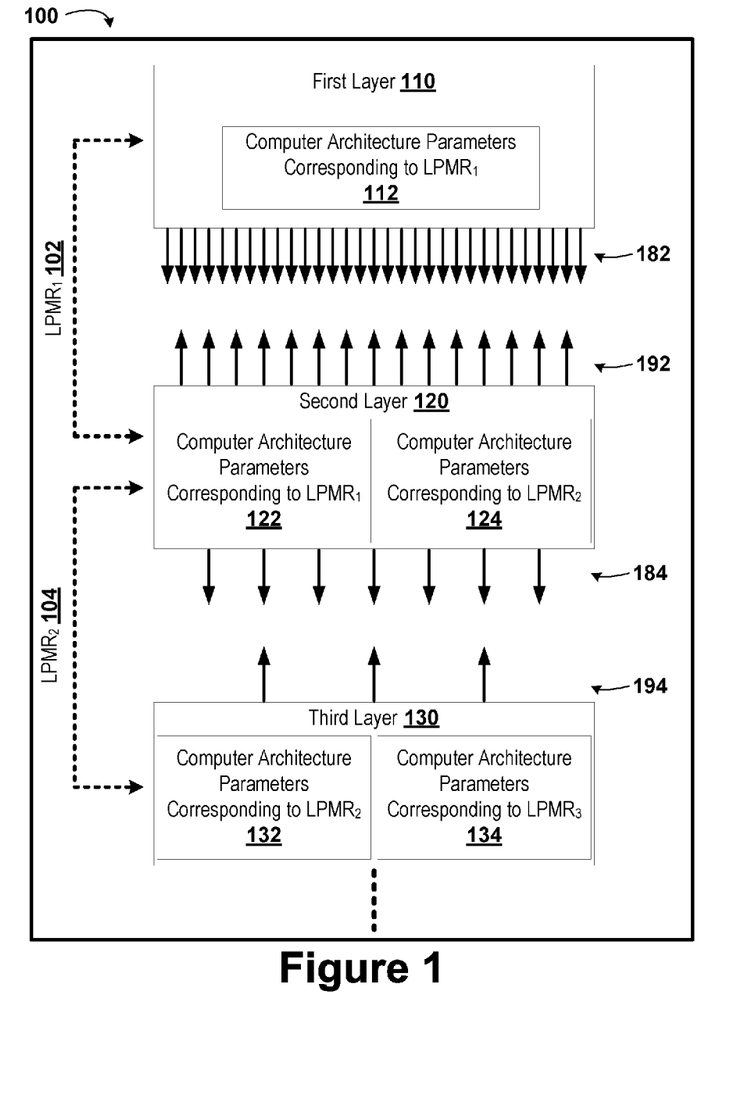
FIG. 1 is a schematic block diagram of a hierarchical memory system, according to example embodiments.

FIG. 1 is a schematic block diagram of a hierarchical memory system 100, according to example embodiments. The hierarchical memory system 100 may include a first layer 110, a second layer 120, and a third layer 130. In alternate embodiments there may be fewer than three memory layers. In still other embodiments, there may be four or more memory layers.

The hierarchical memory system 100 may also include a first Layered Performance Matching Ratio (LPMR$_1$) 102 between the first layer 110 and the second layer 120 and a second Layered Performance Matching Ratio (LPMR$_2$) between the second layer 120 and the third layer 130. In alternate embodiments, there may additional Layered Performance Matching Ratios between additional memory layers. The LPMRs may represent a ratio of a request rate from one layer of the hierarchical memory system to a supply rate by a lower layer of the hierarchical memory system. Such request rates may include rates at which requests are sent from the first layer to the second layer for memory access, and such supply rates may include rates at which memory access responses are sent from the lower layer to the upper layer. Because data access responses occur in response to data access requests, LPMRs may have values greater than or equal to 1.

LPMR$_1$ may be calculated according to the following formula:

$$LPMR_1 = \left( \frac{H_1}{C_{H_1}} + pMR_1 \times \frac{pAMP_1}{C_{M_1}} \right) \times \frac{f_{mem}}{CPI_{exe}}$$

LPMR$_2$ may be calculated according to the following formula:

$$LPMR_2 = \left( \frac{H_2}{C_{H_2}} + pMR_2 \times \frac{pAMP_2}{C_{M_2}} \right) \times \frac{f_{mem} \times MR_1}{CPI_{exe}}$$

Additional LPMRs may be calculated used formulas analogous to the following, with additional Miss Rates (MRs) for additional memory levels:

$$LPMR_3 = \left( \frac{H_3}{C_{H_3}} + pMR_3 \times \frac{pAMP_3}{C_{M_3}} \right) \times \frac{f_{mem} \times MR_1 \times MR_2}{CPI_{exe}}$$

In the above formulae, H represents hit time (e.g., latency time for each memory access), $C_H$ represents hit concurrency (e.g., average hit cache concurrency), pMR represents pure miss rate (e.g., a total number of pure misses occurring during a total number of memory accesses occurring during execution of an executable instruction set), pAMP represents pure average miss penalty (e.g., an average number of pure miss cycles pure miss access during execution of the executable instruction set), $C_M$ represents pure miss concurrency (e.g., an average pure miss concurrency), $f_{mem}$ represents the portion of the instructions that access memory, MR represents miss rate, and $CPI_{exe}$ represents cycles per instruction that occur without data access delay.

Many of the above variables may be considered factors of a concurrent average memory access time (C-AMAT) framework. For example, a pure miss defines a concurrent set of data accesses during a single cycle within the hierarchical memory system in which each data access in the concurrent set does not find data. Because partial misses (i.e., misses other than pure misses) need not cause processor stall, the pure miss is an important metric used in optimizing hierarchical memory systems.

The LPMRs may be adjusted (e.g., by adjusting a set of computer architecture parameters) to satisfy the following inequality:

$$LPMR_1 \leq \frac{\delta \%}{1 - overlapRatio_{c-m}}$$

where $\delta\%$ represents a percentage of memory stall time during execution of an executable instruction set that is deemed acceptable for optimization, and where overlapRatio$_{c-m}$ is a ratio of: (a) time during the execution of the executable instruction set when computing and memory access are simultaneously occurring to (b) total time during execution of the executable instruction set when memory access is occurring.

Further, the first layer 110, the second layer 120, or the third layer 130 may include any of the following computer architecture components: dynamic random access memory (DRAM), a hard drive, a solid state drive, a first level cache, or a lower level cache. Other types of computer architecture components configured to provide and/or request instructions are contemplated herein. The computer architecture components may have one or more associated computer architecture parameters. Such computer architecture parameters may include: a pipeline issue width, a reorder buffer size, a cache size, a cache port number, or a number of miss status holding registers. Each of the computer architecture parameters may correspond to one or more of the layered performance matching ratios. For example, the computer architecture parameters of the first layer 112 may correspond to the LPMR$_1$ 102. Additionally, the computer architecture parameters of the second layer 122/124 may correspond to LPMR$_1$ 102 or to LPMR$_2$ 104. Still further, the computer architecture parameters of the third layer 132/134 may correspond to LPMR$_2$ or a third layered performance matching ratio (LPMR$_3$).

Additionally, the memory layers may communicate with one another. As examples, the first layer 110 may send memory access requests 182 to the second layer 120 or the second layer 120 may send memory access requests 184 to the third layer 130. As alternate examples, the second layer 120 may supply memory responses 192 to the memory access requests 182 or the third layer 130 may supply memory responses 194 to the memory access requests 184.

III. Example Methods

Figure 2:
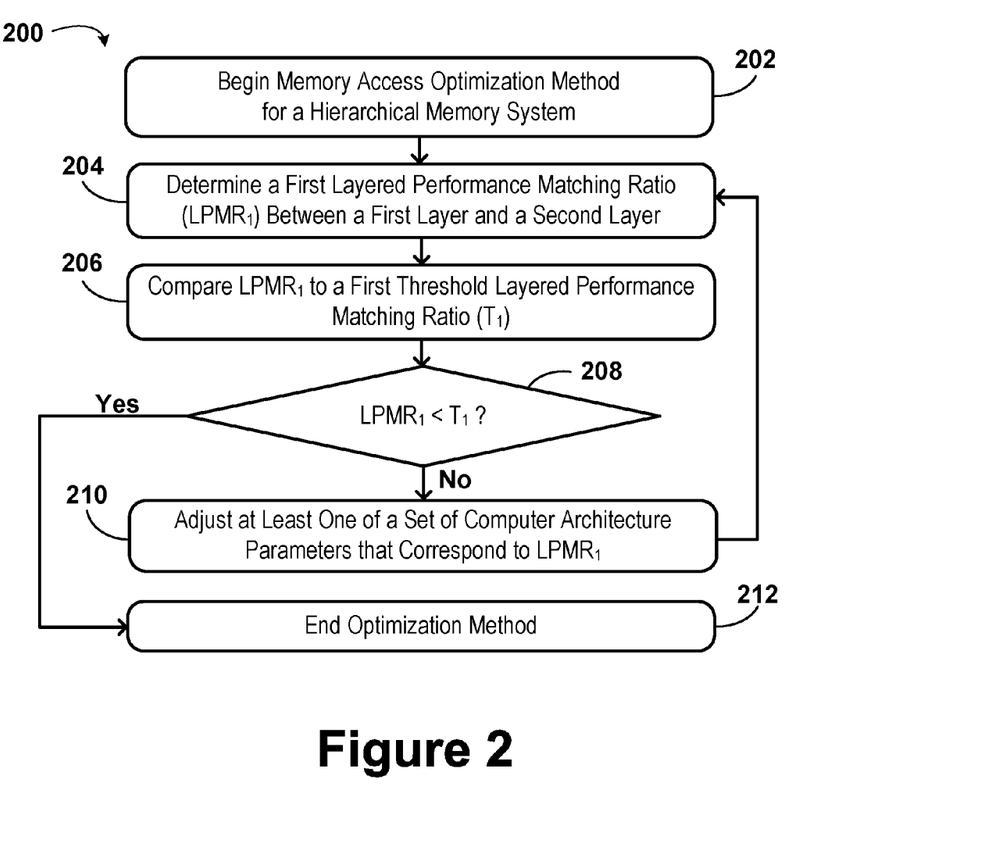
FIG. 2 is a flow chart of a memory access optimization method, according to example embodiments.

FIG. 2 is a flow chart of a memory access optimization method 200, according to example embodiments.

At block 202, the memory access optimization method 200 includes beginning the memory access optimization method 200 for a hierarchical memory system, such as the hierarchical memory system 100 illustrated in FIG. 1.

At block 204, the memory access optimization method 200 includes determining a first Layered Performance Matching Ratio ($LPMR_1$) between a first layer and a second layer, such as the first layer 110 and the second layer 120 illustrated in FIG. 1.

At block 206, the memory access optimization method 200 includes comparing $LPMR_1$ to a first threshold layered performance matching ratio ($T_1$).

At block 208, the memory access optimization method 200 includes evaluating if $LPMR_1$ is less than $T_1$. If $LPMR_1$ is less than $T_1$, the memory access optimization method 200 proceeds to block 212. If $LPMR_1$ is not less than $T_1$, the memory access optimization method 200 proceeds to block 210.

At block 210, the memory access optimization method 200 includes adjusting at least one of a set of computer architecture parameters that correspond to $LPMR_1$. Upon completion of block 210, the memory access optimization method 200 includes returning to block 204.

At block 212, the memory access optimization method 200 includes ending the memory access optimization method 200.

Figure 3:
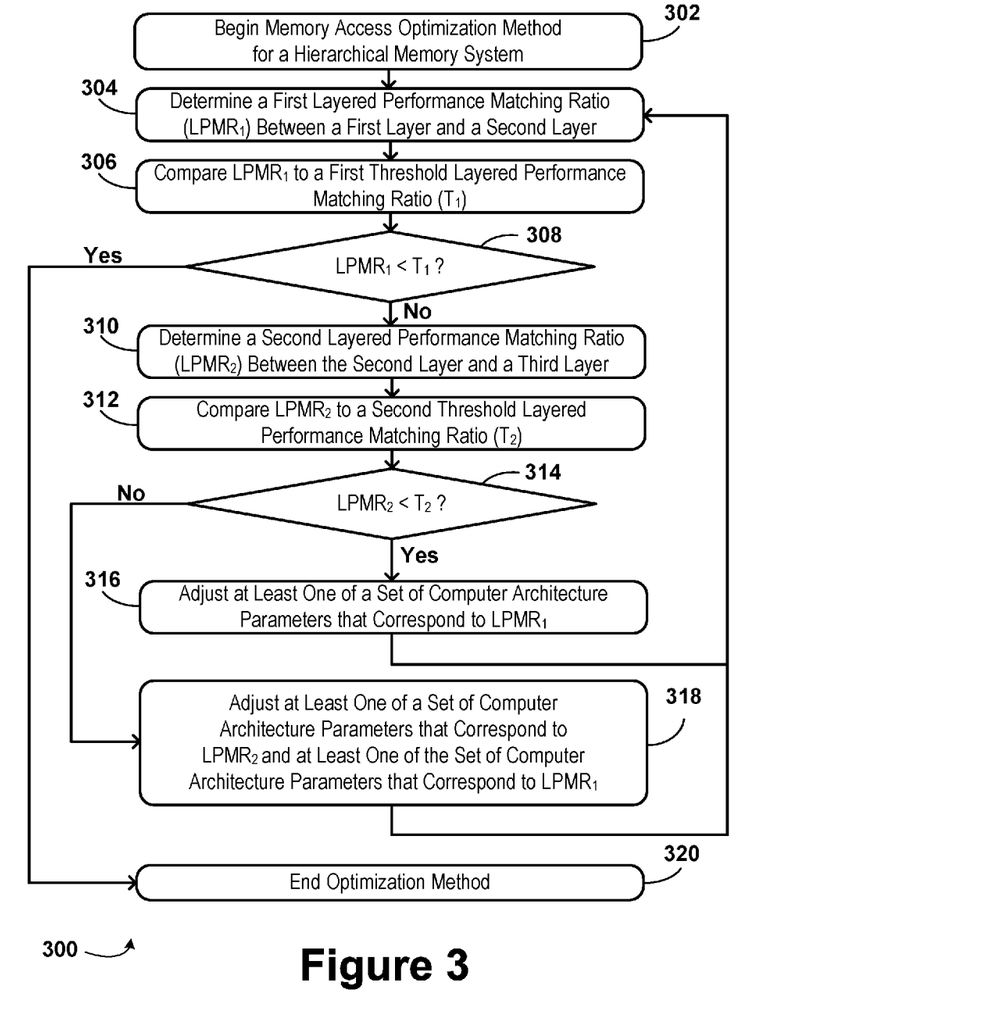
FIG. 3 is a flow chart of a memory access optimization method, according to example embodiments.

FIG. 3 is a flow chart of another memory access optimization method 300, according to example embodiments.

At block 302, the memory access optimization method 300 includes beginning the memory access optimization method 300 for a hierarchical memory system, such as the hierarchical memory system 100 illustrated in FIG. 1.

At block 304, the memory access optimization method 300 includes determining a first Layered Performance Matching Ratio ($LPMR_1$) between a first layer and a second layer, such as the first layer 110 and the second layer 120 illustrated in FIG. 1.

At block 306, the memory access optimization method 300 includes comparing $LMPR_1$ to a first threshold layered performance matching ratio ($T_1$).

At block 308, the memory access optimization method 300 includes evaluating if $LPMR_1$ is less than T1. If $LPMR_1$ is less than $T_1$, the memory access optimization method 300 proceeds to block 320. If $LPMR_1$ is not less than $T_1$, the memory access optimization method 300 proceeds to block 310.

At block 310, the memory access optimization method 300 includes determining a second Layered Performance Matching Ratio ($LPMR_2$) between the second layer and a third layer, such as the second layer 120 and the third layer 130 illustrated in FIG. 1.

At block 312, the memory access optimization method 300 includes comparing $LPMR_2$ to a second threshold layered performance matching ratio ($T_2$).

At block 314, the memory access optimization method 300 includes evaluating if $LPMR_2$ is less than $T_2$. If $LPMR_2$ is less than $T_2$, the memory access optimization method 300 proceeds to block 316. If $LPMR_2$ is not less than $T_2$, the memory access optimization method 300 proceeds to step 318.

At block 316, the memory access optimization method 300 includes adjusting at least one of a set of computer architecture parameters that correspond to $LPMR_1$. Upon completion of block 316, the memory access optimization method 300 includes returning to block 304.

At block 318, the memory access optimization method 300 includes adjusting at least one of a set of computer architecture parameters that correspond to $LPMR_2$ and at least one of the set of computer architecture parameters that correspond to $LPMR_1$. Upon completion of block 318, the memory access optimization method 300 includes returning to block 304.

At block 320, the memory access optimization method 300 includes ending the memory access optimization method 300.

Figure 4:
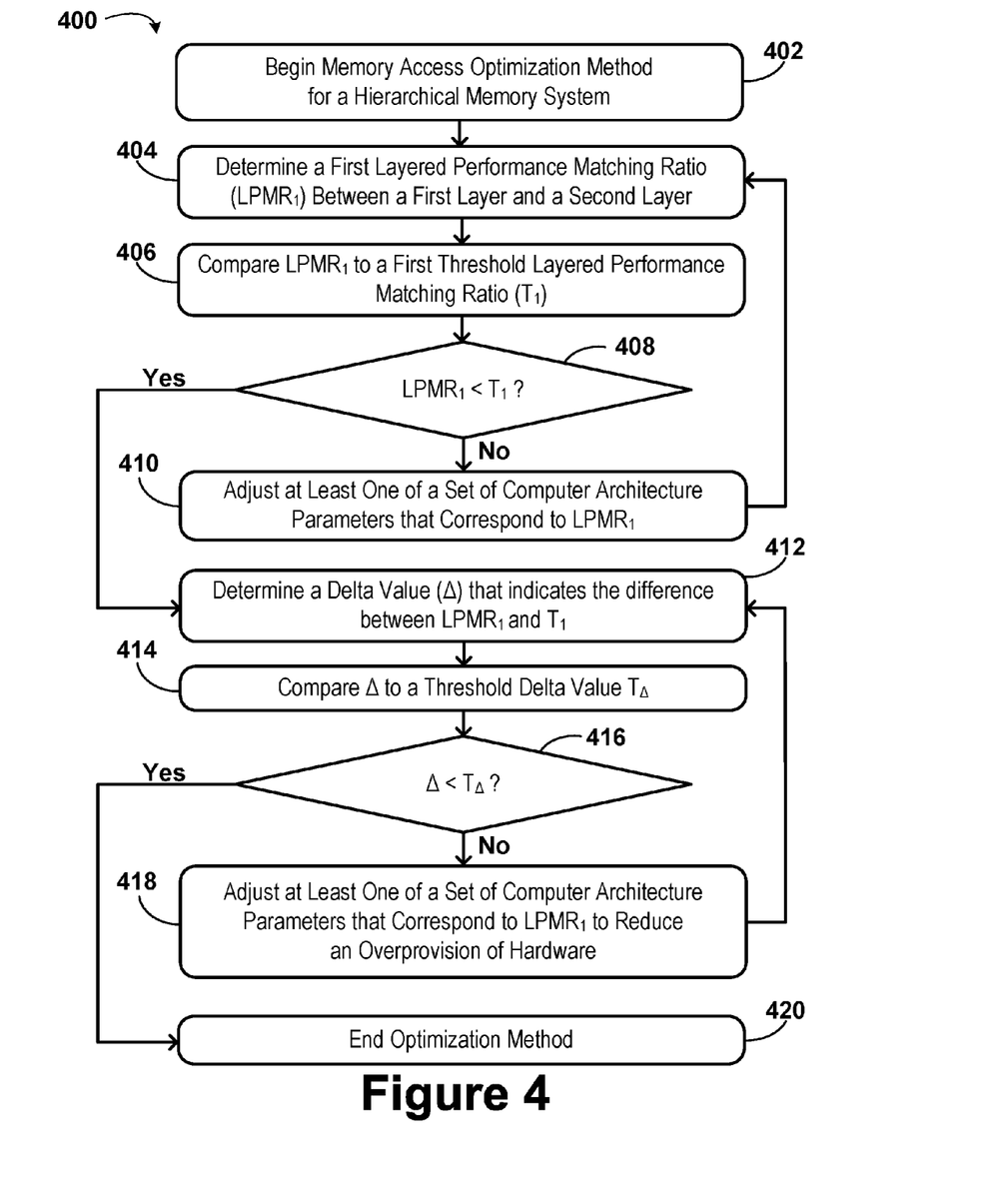
FIG. 4 is a flow chart of a memory access optimization method, according to example embodiments.

FIG. 4 is a flow chart of another memory access optimization method 400, according to example embodiments.

At block 402, the memory access optimization method 400 includes beginning the memory access optimization method 400 for a hierarchical memory system, such as the hierarchical memory system 100 illustrated in FIG. 1.

At block 404, the memory access optimization method 400 includes determining a first Layered Performance Matching Ratio ($LPMR_1$) between a first layer and a second layer, such as the first layer 110 and the second layer 120 illustrated in FIG. 1.

At block 406, the memory access optimization method 400 includes comparing $LPMR_1$ to a first threshold layered performance matching ratio ($T_1$).

At block 408, the memory access optimization method 400 includes evaluating if $LPMR_1$ is less than $T_1$. If $LPMR_1$ is less than $T_1$, the memory access optimization method 400 proceeds to block 412. If $LPMR_1$ is not less than $T_1$, the memory access optimization method 400 proceeds to block 410.

At block 410, the memory access optimization method 400 includes adjusting at least one of a set of computer architecture parameters that correspond to $LPMR_1$. Upon completion of block 410, the memory access optimization method 400 includes returning to block 404.

At block 412, the memory access optimization method 400 includes determining a delta value ($\Delta$) that indicates the difference between $LPMR_1$ and $T_1$.

At block 414, the memory access optimization method 400 includes comparing $\Delta$ to a threshold delta value $T_\Delta$.

At block 416, the memory access optimization method 400 includes evaluating if $\Delta$ is less than $T_\Delta$. If $\Delta$ is less than $T_\Delta$, the memory access optimization method 400 proceeds to block 420. If $\Delta$ is not less than $T_\Delta$, the memory access optimization method 400 proceeds to block 418.

At block 418, the memory access optimization method 400 includes adjusting at least one of a set of computer architecture parameters that correspond to $LPMR_1$ to reduce an overprovision of hardware. Upon completion of block 418, the memory access optimization method 400 includes returning to block 412 of the memory access optimization method 400.

At block 420, the memory access optimization method 400 includes ending the memory access optimization method 400.

Figure 5:
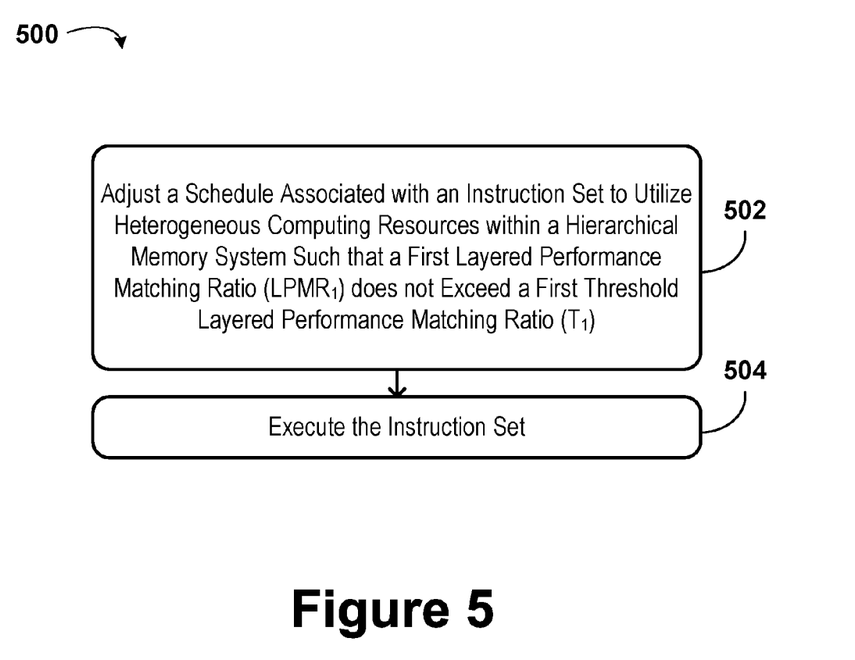
FIG. 5 is a flow chart of a method of accessing memory, according to example embodiments.

FIG. 5 is a flow chart of a method of accessing memory 500, according to example embodiments.

At block 502, the method of accessing memory 500 includes adjusting a schedule associated with an instruction set to utilize heterogeneous computing resources within a hierarchical memory system such that a first layered performance matching ratio ($LPMR_1$) does not exceed a first threshold layered performance matching ratio ($T_1$).

At block 504, the method of accessing memory 500 includes executing the instruction set.

FIGS. 6A-D are schematic illustrations of various optimization approaches, according to example embodiments.

Figure 6A:
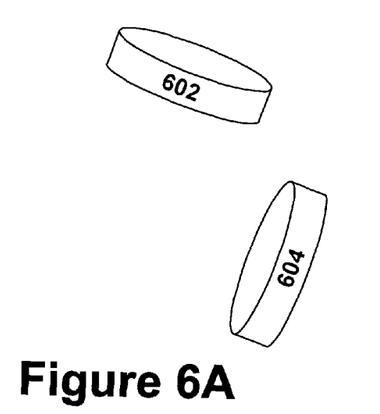
FIG. 6A-6D are schematic illustrations of various optimization approaches, according to example embodiments.
Figure 6B:
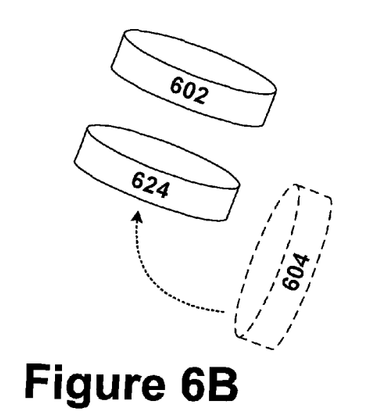
Figure 6C:
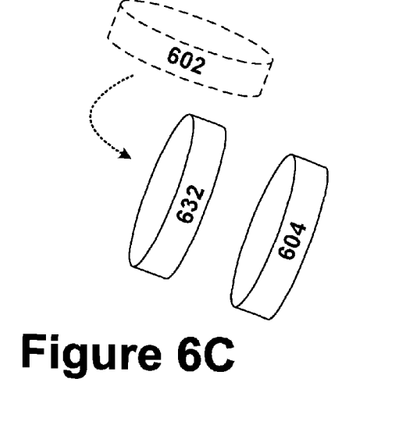
Figure 6D:
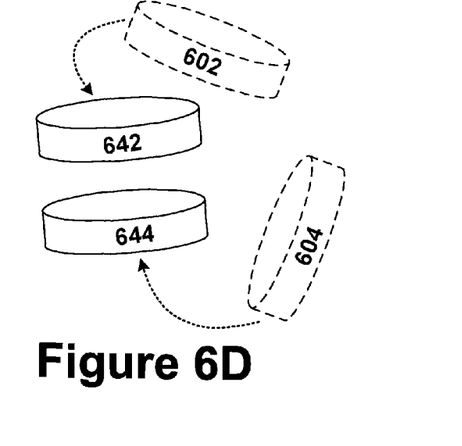

FIG. 6A shows a hierarchical memory system that could be made more efficient through optimization. The hierarchical memory system includes an architecture configuration 602 and an application data access pattern 604. FIGS. 6B-6D illustrate methods of optimizing the hierarchical memory system illustrated in FIG. 6A.

FIG. 6B illustrates utilizing software scheduling to align the application data access pattern 604 with the architecture configuration 602. Once software scheduling has been employed, the application data access pattern 604 may become an optimized application data access pattern 624.

FIG. 6C illustrates utilizing data access patterns of the application data access pattern 604 to adapt the architecture configuration 602. This may be done on-line in some embodiments. Once the architecture adapting has been employed, the architecture configuration 602 may become an optimized architecture configuration 632.

FIG. 6D illustrates utilizing both software scheduling and architecture adapting to optimize memory access in a hierarchical memory system. In an example embodiment, both types of optimization (software scheduling or architecture adaptation) may be performed so as to decrease an overall amount of optimization in either type of optimization individually. Once the software scheduling has been employed, the application data access pattern 604 may become a semi-optimized application data access pattern 644. Once the architecture adapting has been employed, the architecture configuration 602 may become a semi-optimized architecture configuration 642.

Figure 7:
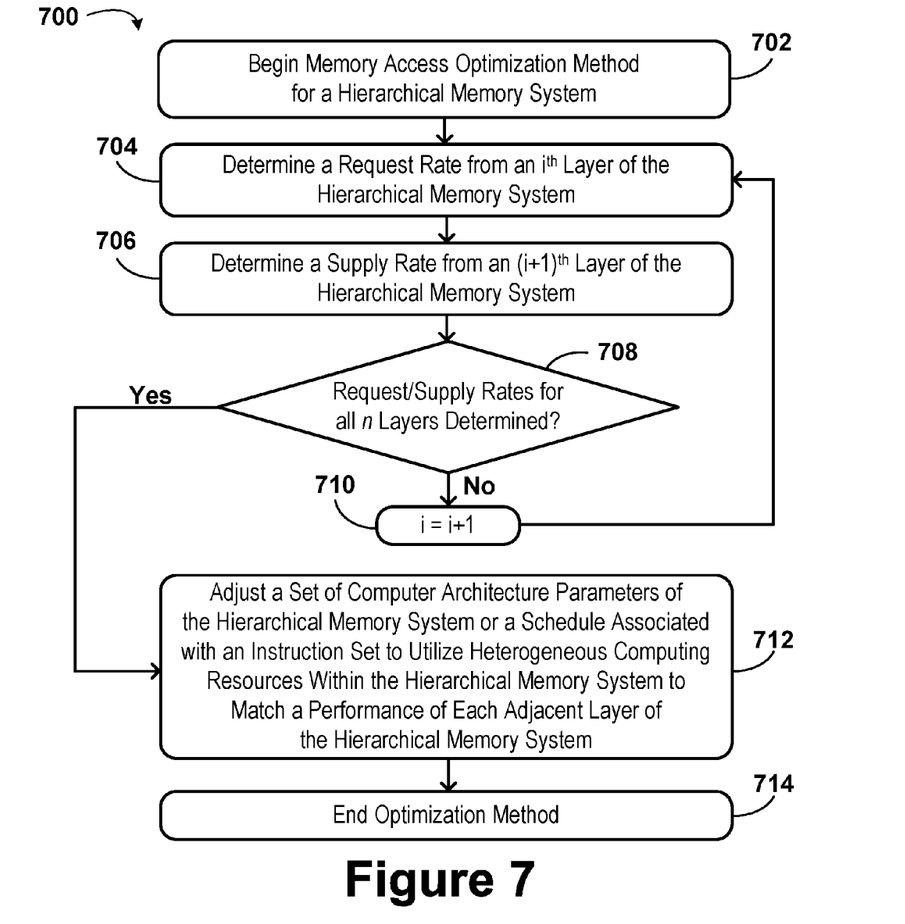
FIG. 7 is a flow chart of a memory access optimization method, according to example embodiments.

FIG. 7 is a flow chart of another memory access optimization method 700, according to example embodiments. The memory access optimization method 700 may be employed to globally optimize a hierarchical memory system, for example.

At block 702, the memory access optimization method 700 includes beginning the memory access optimization method 700 for a hierarchical memory system, such as the hierarchical memory system 100 illustrated in FIG. 1. Beginning the memory access optimization method 700 may include instantiating variables. For example, block 702 may include setting an iterative variable i to a value of zero.

At block 704, the memory access optimization method 700 includes determining a request rate from an $i^{th}$ layer of the hierarchical memory system.

At block 706, the memory access optimization method 700 includes determining a supply rate from an $(i+1)^{th}$ layer of the hierarchical memory system. In some embodiments, the supply rate from the $(i+1)^{th}$ layer of the hierarchical memory system may correspond to the request rate from the $i^{th}$ layer of the hierarchical memory system At block 708, the memory access optimization method 700 includes determining if the request rate and the supply rate for each of the n layers has been determined. In some embodiments, for example, n may up to and including one less than the total number of layers within the hierarchical memory system. If the request rate and the supply rate for all n layers has been determined, the method 700 may progress to block 712. If the request rate and the supply rate for all n layers has not been determined, the method 700 may progress to block 710.

At block 710, the memory access optimization method 700 includes incrementing the iterative variable, i in this embodiment, by one (e.g., i=i+1).

At block 712, the memory access optimization method 700 includes adjusting a set of computer architecture parameters of the hierarchical memory system or a schedule associated with an instruction set to utilize heterogeneous computing resources within the hierarchical memory system to match a performance of each adjacent layer of the hierarchical memory system. The performance of each adjacent layer of the hierarchical memory system may be matched, in some embodiments, based on a concurrent average memory access time (C-AMAT) model. Further, the performance of each adjacent layer being matched may include matching the request rate to the supply rate for each of the n layers in the hierarchical memory system.

At block 714, the memory access optimization method 700 includes ending the memory access optimization method 714.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A method of optimizing memory access in a hierarchical memory system, comprising:
  determining a first layered performance matching ratio between a first layer of the hierarchical memory system and a second layer of the hierarchical memory system, wherein determining the first layered performance matching ratio comprises:
    summing: (1) a ratio of: (a) a first hit time value to (b) a first hit concurrency value with (2) a product of: (i) a first pure miss rate value and (ii) a ratio of: (a) a first pure average miss penalty value to (b) a first pure miss concurrency value; and
    multiplying: (1) the determined sum by (2) a ratio of: (a) a value corresponding to a portion of instructions of an executable instruction set that accesses the hierarchical memory system to (b) a value corresponding to a number of cycles per executable instruction when no misses occur;
  comparing the determined first layered performance matching ratio to a first threshold layered performance matching ratio; and
  adjusting, if the determined first layered performance matching ratio exceeds the first threshold layered performance matching ratio, at least one of a set of computer architecture parameters of the hierarchical memory system corresponding to the first layered performance matching ratio.

2. The method of claim 1, further comprising:
  determining a second layered performance matching ratio between the second layer of the hierarchical memory system and a third layer of the hierarchical memory system, wherein determining the second layered performance matching ratio comprises:
    summing: (1) a ratio of: (a) a second hit time value to (b) a second hit concurrency value with (2) a product of: (i) a second pure miss rate value and (ii) a ratio of: (a) a second pure average miss penalty value to (b) a second pure miss concurrency value;
    multiplying: (1) the determined sum by (2) the ratio of: (a) the value corresponding to the portion of instructions of the executable instruction set that accesses the hierarchical memory system to (b) the value corresponding to the number of cycles per executable instruction when no misses occur; and
    multiplying: (1) the determined product by (2) one or more miss rate values;
  comparing the determined second layered performance matching ratio to a second threshold layered performance matching ratio; and adjusting, if the determined second layered performance matching ratio exceeds the second threshold layered performance matching ratio, at least one of a set of computer architecture parameters of the hierarchical memory system corresponding to the second layered performance matching ratio.

3. The method of claim 1, wherein the set of computer architecture parameters of the hierarchical memory system corresponding to the first layered performance matching ratio comprises a pipeline issue width, an issue width size, a reorder buffer size, a first cache size associated with the first layer of the hierarchical memory system, a second cache size associated with the second layer of the hierarchical memory system, a first cache port number associated with the first layer of the hierarchical memory system, a second cache port number associated with the second layer of the hierarchical memory system, and a number of miss status holding registers.

4. The method of claim 1, further comprising adjusting a schedule associated with the executable instruction set to utilize heterogeneous computing resources within the hierarchical memory system in order to reduce the first layered performance matching ratio.

5. The method of claim 1, wherein the first threshold layered performance matching ratio comprises a ratio of: (a) a percentage to a difference between 1 and (b) an overlap ratio, wherein the percentage corresponds to a percentage of memory stall time during execution of the executable instruction set that is deemed acceptable for optimization, and wherein the overlap ratio is a ratio of: (a) time during the execution of the executable instruction set when computing and memory access are simultaneously occurring to (b) total time during execution of the executable instruction set when memory access is occurring.

6. The method of claim 1, wherein comparing the determined first layered performance matching ratio to the first threshold layered performance matching ratio comprises determining a delta value that indicates the difference between the first layered performance matching ratio and the first threshold layered performance matching ratio.

7. The method of claim 6, further comprising adjusting, if the determined first layered performance matching ratio is less than the first threshold layered performance matching ratio and the delta value is greater than a threshold delta value, at least one of the set of computer architecture parameters of the hierarchical memory system corresponding to the first layered performance matching ratio to reduce an overprovision of hardware.

8. The method of claim 1, wherein a pure miss, associated with the first pure miss rate value, the first pure average miss penalty value, and the first pure miss concurrency value, defines a concurrent set of data accesses during a single cycle within the hierarchical memory system in which each data access in the concurrent set does not find data.

9. The method of claim 1, wherein the ratio of: (a) the first hit time value to (b) the first hit concurrency value corresponds to: (a) a latency time for each memory access hit divided by (b) an average hit cache concurrency.

10. The method of claim 1, wherein the ratio of: (a) the first pure average miss penalty value to (b) the first pure miss concurrency value corresponds to: (a) an average number of pure miss cycles per miss access during execution of the executable instruction set divided by (b) an average pure miss concurrency.

11. The method of claim 1, wherein the first pure miss rate value corresponds to a total number of pure misses occurring during a total number of memory accesses occurring during execution of the executable instruction set.

12. The method of claim 1, wherein the first layered performance matching ratio comprises a ratio of: (a) a request rate from the first layer of the hierarchical memory system to (b) a supply rate by the second layer of the hierarchical memory system, wherein the request rate from the first layer of the hierarchical memory system comprises a rate at which requests are sent from the first layer to the second layer for memory access, and wherein the supply rate by the second layer of the hierarchical memory system comprises a rate at which memory access responses are sent from the second layer to the first layer.

13. The method of claim 1, wherein the first layer of the hierarchical memory system is selected from the group consisting of a first level cache, a lower level cache, a hard drive, and a solid state drive.

14. The method of claim 1, wherein the second layer of the hierarchical memory system is selected from the group consisting of a first level cache, a lower level cache, a hard drive, and a solid state drive.

15. A hierarchical memory system, comprising:
a first layer;
a second layer;
a first layered performance matching ratio between the first layer and the second layer; and
a set of computer architecture parameters corresponding to the first layered performance matching ratio,
wherein the first layered performance matching ratio comprises a product between: (1) a sum and (2) a ratio of: (a) a value corresponding to a portion of instructions of an executable instruction set that accesses the hierarchical memory system to (b) a value corresponding to a number of cycles per executable instruction when no misses occur, wherein the sum is between: (i) a ratio of: (a) a first hit time value to (b) a first hit concurrency value and (ii) a product of: (1) a first pure miss rate value and (2) a ratio of: (a) a first pure average miss penalty value to (b) a first pure miss concurrency value, and
wherein the hierarchical memory system is configured to adjust at least one of the set of computer architecture parameters corresponding to the first layered performance matching ratio if the first layered performance matching ratio exceeds a first threshold layered performance matching ratio.

16. The hierarchical memory system of claim 15, further comprising:
a third layer;
a second layered performance matching ratio between the second layer and the third layer; and
a set of computer architecture parameters corresponding to the second layered performance matching ratio,
wherein the second layered performance matching ratio is a product among: (1) one or more miss rate values, (2) an additional sum, and (3) the ratio of: (a) the value corresponding to the portion of instructions of the executable instruction set that accesses the hierarchical memory system to (b) the value corresponding to the number of cycles per executable instruction when no misses occur, wherein the additional sum is between: (i) a ratio of: (a) a second hit time value to (b) a second hit concurrency value and (ii) a product of: (1) a second pure miss rate value and (2) a ratio of: (a) a second pure average miss penalty value to (b) a second pure miss concurrency value, wherein the hierarchical memory system is configured to adjust at least one of the set of computer architecture parameters corresponding to the second layered performance matching ratio if the second layered performance matching ratio exceeds a second threshold layered performance matching ratio.

17. The hierarchical memory system of claim 15, wherein the set of computer architecture parameters corresponding to the first layered performance matching ratio comprises a pipeline issue width, an issue width size, a reorder buffer size, a first cache size associated with the first layer, a second cache size associated with the second layer, a first cache port number associated with the first layer, a second cache port number associated with the second layer, and a number of miss status holding registers.

18. The hierarchical memory system of claim 15, wherein the hierarchical memory system is configured to adjust a schedule associated with the executable instruction set to utilize heterogeneous computing resources within the hierarchical memory system in order to reduce the first layered performance matching ratio.

* * * * *